E. E. CHESNEY.
Corn-Planter.
No. 43,181. Patented June 21, 1864
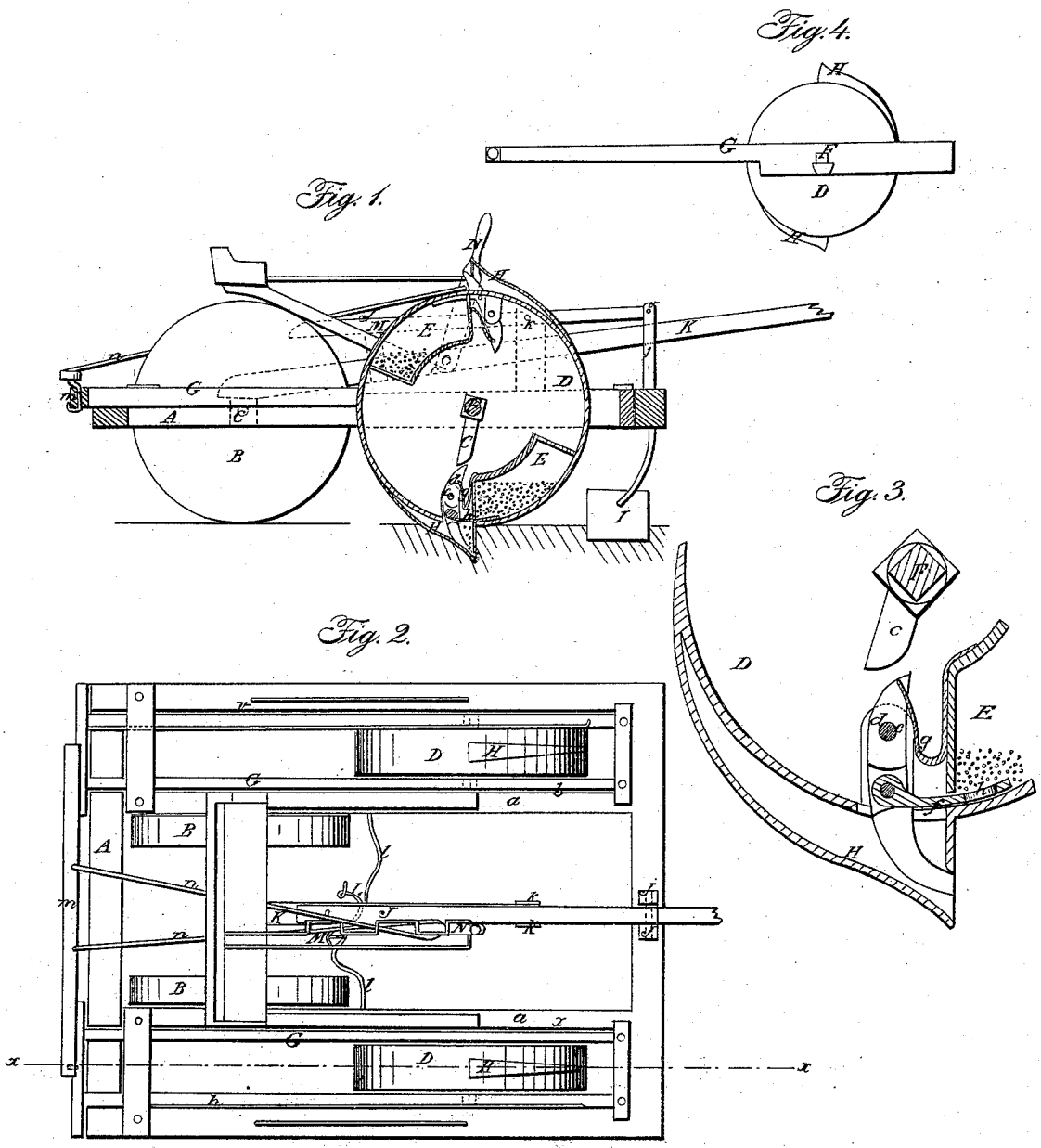
Witnesses:
Jno Coombs
Geo W Reed
Inventor:
E E Chesney
per Munn & Co
attys

UNITED STATES PATENT OFFICE.

E. E. CHESNEY, OF ABINGDON, ILLINOIS.

IMPROVEMENT IN CORN-PLANTERS.

Specification forming part of Letters Patent No. 43,181, dated June 21, 1864.

*To all whom it may concern:*

Be it known that I, E. E. CHESNEY, of Abingdon, in the county of Knox and State of Illinois, have invented a new and Improved Corn-Planter; and I do hereby declare that the following is a full, clear, and exact description of the same, reference being had to the accompanying drawings, making a part of this specification, in which—

Figure 1 represents a longitudinal vertical section of this invention, taken in the plane indicated by the line $xx$, Fig. 2. Fig. 2 is a plan or top view of the same. Fig. 3 is a longitudinal vertical section of the seed-distributing device detached, on a larger scale than the previous figures. Fig. 4 is a side elevation of my invention when used for hand-planting.

Similar letters of reference in the views indicate corresponding parts.

This invention consists in the arrangement of one or more bill-shaped shoes on the circumference of a hollow planting-wheel rotating freely on a stationary axle, in combination with a tappet attached to said axle, and acting upon a trigger which connects with a seed-slide extending into a seed-box in the interior of the planting-wheel in such a manner that for each revolution of the planting-wheel on the ground the seed slide or slides in the shoe or shoes are actuated and a quantity of seed is deposited in the ground in hills at the desired distances apart.

The invention consists, also, in arranging the planting-wheels in longitudinally-sliding frames, which connect with a hand-lever in front of the driver's seat in such a manner that the driver is enabled from his seat to shift the planting-wheels backward or forward, and to bring them in the correct position in commencing a new row.

It consists, finally, in a cam acting on suitable stops, in combination with the planting-wheels, and with a foot-lever in front of the driver's seat, in such a manner that the driver is enabled at any moment to stop the rotation of the planting-wheels and to raise them out of the ground in order to turn the machine at either end of the field.

To enable those skilled in the art to make and use my invention, I will proceed to describe it.

A represents a frame, made of wood or any other suitable material, and supported in the rear by two wheels, B, which run on an axle, C. This axle has its bearings in suitable boxes attached to the longitudinal timbers $a$ of the frame A, and the wheels B B are close enough together to run between the hills to be planted.

The front part of the frame A is supported by the planting-wheels D, which are made hollow and provided each with two seed-boxes, E, as clearly shown in Fig. 1 of the drawings. The axles F of the planting-wheels have their bearings in sliding frames G, which fit into suitable grooves or ways, $b$, in the main frame A, outside the wheels B. Each of the axles F is provided with a stationary cam or tappet, $c$, and the seed is discharged from the seed-boxes E by the action of said tappets on triggers $d$, which have their fulcrums on pivots $e$ in the interior of the planting-wheels, and which connect by means of hinge-joints with the seed-slides $f$. Each of the triggers extends beyond its pivot and is exposed to the action of a spring, $g$, (see Fig. 3,) which has a tendency to throw the same in such a position that the seed-cells $h$ in the slides $f$ are in the interior of the seed-boxes and the outer ends of the triggers close the outlet-openings in the bill-shaped shoes H, through which the seed from the seed-boxes is to be discharged. As the planting-wheel rotates the seed-cells fill with seed, and when the trigger strikes the tappet $c$ the outlet-opening in the shoe is opened, and at the same time the seed-slide is drawn out to the position shown in Fig. 1, and the seed from the seed-cell drops down and escapes through the opening in the shoe. After the tappet has passed the trigger the outer end of the same flies back to its original position, and any seed that may have lodged on the inside of the shoe is pushed out and the seed-slide moves back into the seed-box, ready for a new charge. The seed drops into the track cleared by the plows I in front of the planting-wheels, and each of the planting-wheels is provided with two seed-boxes and shoes diametrically opposite to each other. If the diameter of these wheels is equal to two feet six inches, their circumference is equal to eight feet, or nearly so, and the hills planted by the machine will be four feet apart.

In order to be able to plant so as to cultivate both ways, a foot-lever, J, is connected with the draft pole or tongue K in such a manner that by stepping on said lever the front part of the frame A is raised and the planting-wheels thrown out of the ground. The lever J has its fulcrum on a pivot, $i$, passing through standards $j$, which rise from the front cross-bar of the frame A, and it connects by straps $k$ with the draft-pole, which is secured at its rear end to the axle of the wheels B. The front end of the draft-pole is attached to the draft-animals, and if the driver depresses with his foot the rear end of the lever the planting-wheels are raised from the ground.

The rotary motion of the planting-wheels can be stopped at any moment by a cam, L, which acts on a lever, M, from which two bolts, $l$, extend, one toward each of the planting-wheels. The cam L is so situated that it can be reached and turned from the driver's seat, and by its action on the lever M the bolts $l$ are pushed against the sides of the planting-wheels and the motion of the latter is arrested. In practice the sides of the planting-wheels will be provided with cavities for the bolts to drop into. In its normal position the lever M forms a prop for the foot-lever J and tongue or draft-pole K.

In order to commence the rows at the exact spot, the sliding frames G connect by means of a cross-bar, $m$, and rod $n$ with a hand-lever, N, in front of the driver's seat.

In planting with my planter I start and go directly across the field, and every revolution of each planting-wheel plants two hills, each hill being marked by the puncture of the shoe in the ground. On approaching the last hills in the rows I turn with my foot the cam L, and the bolts $l$ arrest the motion of the planting-wheels just as they plant the last hills. By the motion of the cam the lever M is pushed from under the foot-lever J, and by a pressure of the foot on said lever the front part of the planter is suddenly thrown out of the ground. In this position the machine is turned around and the team stopped with the pointers as near as possible even with the last hill on the row just planted. The position of the planting-wheels is finally adjusted with perfect accuracy by shifting the sliding frames until the axles of said wheels are even with the last hill in the last row, and then the front part of the machine is let down and the planting-wheels are released from the bolts $l$ by turning the cam L back and pushing the lever M under the foot-lever J, and the team is started. All these operations can be performed by the driver from his seat in a very short time and with comparatively little exertion, and the hills are planted exactly in line.

My planter can also be used with advantage in hand-planting. If one of the sliding frames is taken out, the planting-wheel attached to the same can be placed on the ground and the planting performed by pushing the same along from one end of the field to the other. During this operation the rear cross-bar of the sliding frame serves as a handle, and if the operator takes care to start right the hills will be planted in even rows.

In practice the planting-wheels will be provided with doors in the sides, giving access to the seed-boxes, and the planter can be easily arranged for replanting by connecting with the axles of the planting-wheels or with the cams on said axles a contrivance whereby said cams can be forced on one side at any moment. In replanting, whenever the machine comes to a good hill the cam is forced aside and no corn is discharged.

I am aware that corn-planters have before been made with hollow planting-wheels provided with valved shoes to penetrate the ground and deposit seed therein, and therefore do not claim this broadly.

What I claim as new, and desire to secure by Letters Patent, is—

1. The bill-shaped shoes H on the circumference of the hollow planting-wheels D, in combination with the tappets $c$, triggers $d$, and seed-boxes E, all arranged and operating substantially as and for the purposes set forth.

2. The sliding frames G, in combination with the planting-wheels D, constructed and operating substantially as described.

3. The arrangement and combination of the cam L, lever M, bolts $l$, foot-lever J, tongue K, and planting-wheels D, all constructed and operating in the manner and for the purpose substantially as herein specified.

E. E. CHESNEY.

Witnesses:
D. W. ANDREWS,
J. C. CHESNEY.